(12) United States Patent
Liu et al.

(10) Patent No.: US 8,743,669 B2
(45) Date of Patent: Jun. 3, 2014

(54) OPTICAL DISC DRIVE AND METHOD OF ACCESSING OPTICAL DISC

(75) Inventors: Yaohua Liu, Shenjen (CN); Chia-Feng Lin, Hsinchu (TW); Wenhua Liu, Shenjen (CN)

(73) Assignee: Mediatek Singapore Pte. Ltd., Singapore (SG)

( * ) Notice: Subject to any disclaimer, the term of this patent is extended or adjusted under 35 U.S.C. 154(b) by 0 days.

(21) Appl. No.: 13/406,155

(22) Filed: Feb. 27, 2012

(65) Prior Publication Data
US 2013/0028062 A1 Jan. 31, 2013

(30) Foreign Application Priority Data
Feb. 28, 2011 (CN) .......................... 2011 1 0047604

(51) Int. Cl.
*G11B 7/00* (2006.01)

(52) U.S. Cl.
USPC ...................... 369/47.47; 369/47.27; 707/823

(58) Field of Classification Search
USPC .......... 369/30.03, 30.01, 47.47, 47.27, 47.31, 369/47.54; 707/823
See application file for complete search history.

(56) References Cited

U.S. PATENT DOCUMENTS

| | | | | |
|---|---|---|---|---|
| 8,024,363 | B2 * | 9/2011 | Araki et al. | 707/791 |
| 8,111,597 | B2 * | 2/2012 | Miyamoto | 369/47.27 |
| 2003/0008646 | A1 * | 1/2003 | Shanahan | 455/418 |
| 2006/0140080 | A1 * | 6/2006 | Yen et al. | 369/47.1 |
| 2007/0147190 | A1 * | 6/2007 | Mons | 369/30.03 |
| 2007/0286050 | A1 * | 12/2007 | Araki et al. | 369/99 |
| 2008/0181080 | A1 * | 7/2008 | White et al. | 369/84 |
| 2010/0329089 | A1 * | 12/2010 | Jeong et al. | 369/47.15 |
| 2012/0113779 | A1 * | 5/2012 | Oh | 369/47.15 |
| 2012/0158804 | A1 * | 6/2012 | Lim | 707/823 |

FOREIGN PATENT DOCUMENTS

| CN | 1774761 | 5/2006 |
|---|---|---|
| CN | 101882132 | 11/2010 |

OTHER PUBLICATIONS

English language translation of abstract of CN 1774761 (published May 17, 2006).
English language translation of abstract of CN 101882132 (published Nov. 10, 2010).

\* cited by examiner

*Primary Examiner* — Thomas Alunkal
(74) *Attorney, Agent, or Firm* — McClure, Qualey & Rodack, LLP

(57) ABSTRACT

An optical disc drive and a method of reading an optical disc are disclosed. The drive includes an I/O port, an optical pickup module and a format conversion unit. The I/O port couples a host to receive a read command of a host terminal file system format. The optical pickup module accesses the optical disc which contains data of a first file system format. The format conversion unit coupled between the I/O port and the optical pickup module includes a mapping information generation module, a memory module and a read-command processing module. The mapping information generation module controls the optical pickup module to access data and thereby to generate mapping information. The memory module stores the mapping information. The read-command processing module controls the optical pickup module to access the optical disc according to the read command by referring to the mapping information.

12 Claims, 11 Drawing Sheets

OPTICAL DISC DRIVE AND METHOD OF ACCESSING OPTICAL DISC

CROSS REFERENCE TO RELATED APPLICATIONS

This Application claims priority of China Patent Application No. 201110047604.8, filed on Feb. 28, 2011, the entirety of which is incorporated by reference herein.

BACKGROUND OF THE INVENTION

1. Field of the Invention

The present invention relates to an optical disc drive, and in particular relates to an optical disc drive that is externally coupled to a low-end host.

2. Description of the Related Art

Low-end electronic devices are generally limited to a few specific data formats, for example, limited to a FAT 32 (File Allocation Table 32) file system format. Thus, external devices to be coupled to a low-end electronic device are restricted in terms of comporting to the specific data format.

Generally, data is recorded on an optical disc in the ISO 9660 or UDF file system format. However, some cost-reduced multimedia display systems (e.g. digital television) are incapable of recognizing data or files of the ISO 9660 file system format or the UFD file system format and therefore are incapable of coupling to an external optical disc drive, which is very inconvenient. Thus, it is desirable to provide optical disc drives capable of outputting data of the FAT 32 file system format.

BRIEF SUMMARY OF THE INVENTION

In view of the foregoing, the invention provides technical solutions as follows.

An optical disc drive in accordance with an exemplary embodiment of the invention is shown. The optical disc drive comprises an I/O port, an optical pickup module and a format conversion unit. The I/O port is operative to couple the optical disc drive to a host to receive a read command that complies with a host terminal file system format. The optical pickup module is operative to access an optical disc containing data of a first file system format. The format conversion unit is coupled between the I/O port and the optical pickup module and comprises a mapping information generation module, a memory module and a read-command processing module. The mapping information generation module controls the optical pickup module to access the optical disc and thereby generates mapping information. The memory module stores the mapping information. By referring to the mapping information, the read-command processing module controls the optical pickup module to access data requested by the read command.

An optical disc accessing method is further shown in accordance with an exemplary embodiment of the invention, which comprises: a) receiving a read command from a host, wherein the read command complies with a host terminal file system format used in the host; b) accessing an optical disc of the optical disc drive and generating mapping information of data accessed from the optical disc, wherein the data recorded on the optical disc has a first file system format that is different from the host terminal file system format, c) storing the mapping information in a memory module, and d) accessing the data, requested by the read command, from the optical disc by referring to the mapping information stored in the memory module.

The disclosed optical disc drive and the optical disc accessing method convert the format of the files stored in an optical disc to allow a cost-reduced host which uses a file system format distinct from that of the optical disc to access the optical disc.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In the specification and the claims, the disclosed components or modules are named. A person skilled in the art should understand that for different manufactures the same components may be named distinctly. It should be noted that in the specification and in the claims the disclosed techniques should be recognized according to their operations or functions rather than their names. A term "comprise/comprising" is used through the specification and the claims and is an open-ended term that encompasses all the elements listed but may also include additional, unnamed elements. A term "couple/coupling" means any direct or indirect electrical connection. When a description recites that a first device is coupled to a second device, it means that the first device may be electrically connected to the second device without other components there between, or, the first device may be electrically connected to the second device by other devices or additional connection techniques.

Figure 1:
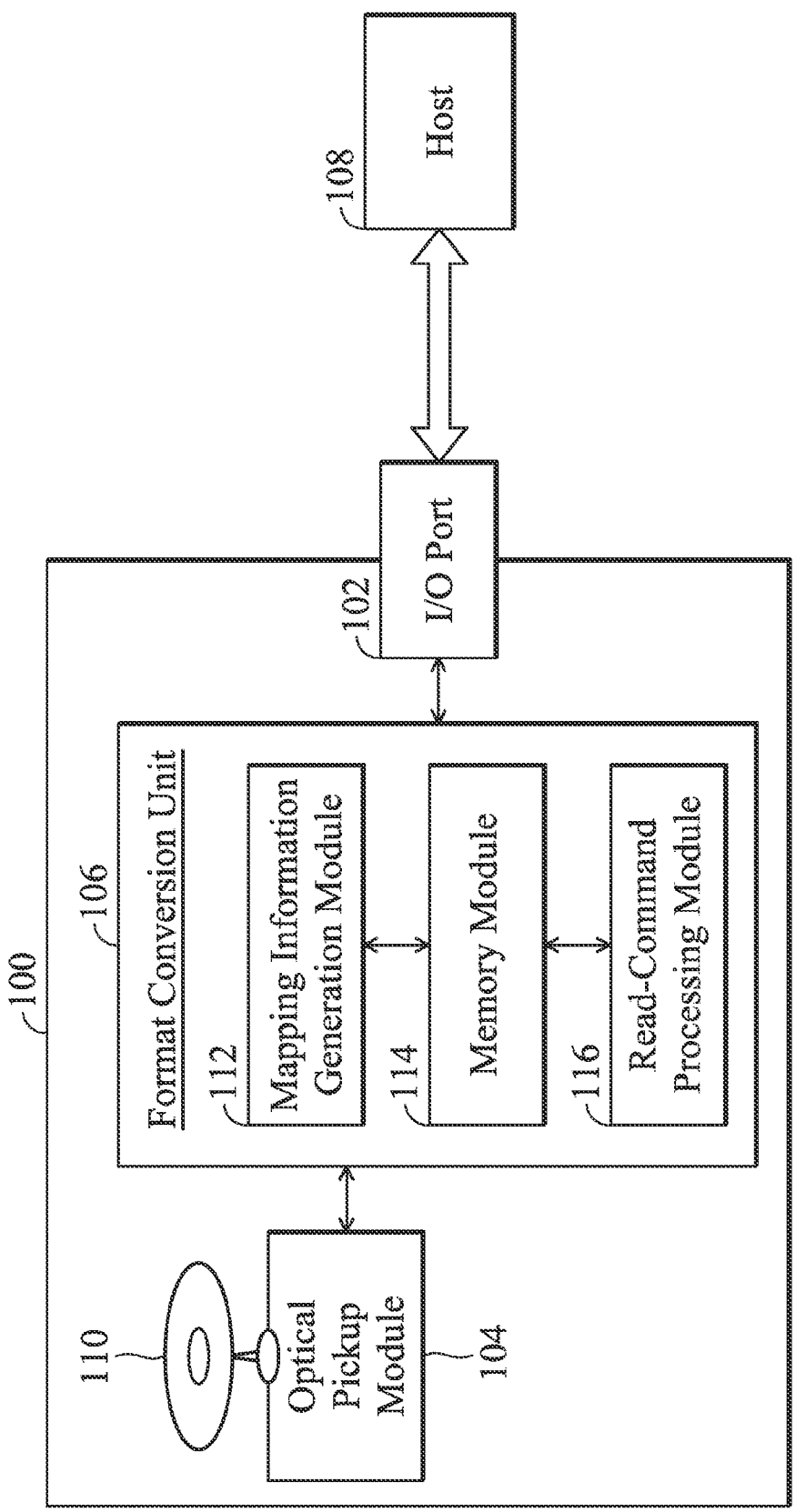
FIG. 1 is a block diagram depicting an optical disc drive in accordance with an exemplary embodiment of the invention.

FIG. 1 is a block diagram depicting an optical disc drive 100 in accordance with an exemplary embodiment of the invention. The optical disc drive 100 comprises an I/O port 102, an optical pickup module 104 and a format conversion unit 106. The I/O port 102 is operative to couple the optical disc drive 100 to a host 108. The optical pickup module 104 is operative to access an optical disc 110 inserted into the optical disc drive 100. The data recorded on the optical disc 110 complies with a first file system format, such as the ISO 9660 or UDF file system format. The format conversion unit 106 is coupled between the I/O port 102 and the optical pickup module 104.

The format conversion unit 106 converts the data or files recorded on the optical disc 110 in the first file system format into data or files of a host terminal file system format used in the host 108. The format conversion unit 106 comprises a mapping information generation module 112, a memory module 114 and a read-command processing module 116.

The mapping information generation module 112 controls the optical pickup module 104 to access data or files recorded on the optical disc 110 and thereby generates mapping information of the accessed data or file for mapping to the host terminal file system format. The memory module 114 stores the mapping information. The read-command processing module 116 receives a read command from the host 108 through the I/O port 102. The read command includes an access address that complies with the host terminal file system format. The read-command processing module 116 accesses data or file requested according to the access address by referring to the mapping information stored in the memory module 114 and thereby outputs the data or files requested by the read command to the host 108 via the I/O port 102.

The host terminal file system format contains a boot sector, a FAT sector. And further the host terminal file system format may further comprise directory or file. The mapping information contains data of the boot sector, address mapping information about the FAT sector, and address mapping information about directories and files recorded on the optical disc 110. The boot sector is the beginning sector of the host terminal file system format, and the data thereof comprises a Master Boot Record (MBR) and/or a Dos Boot Record (DBR). The address mapping information about the FAT sector contains a FAT sector start logical block address (LBA) or a root directory start LBA. The FAT sector start LBA represents a start address of the FAT sector of a host terminal file system format. The root directory start LBA represents a start address of a root directory of a host terminal file system format, and is subsequent to an end address of the FAT sector. The address mapping information about the data recorded on the optical disc 110 contains LBAs indicating physical addresses of the optical disc 110, and may further comprise a start cluster number, an end cluster number or length information optionally.

In an exemplary embodiment, for a directory recorded in an optical disc 110, the address mapping information contains a directory LBA, a directory start cluster number, a directory end cluster number or directory length information. The directory LBA represents the physical address on the optical disc 110 that indicates the location of the directory. The directory start cluster number and the directory end cluster number represent a start address and an end address that the directory correlates to in the host terminal file system format, respectively. The directory length information shows the data length of the directory. Therefore, the directory end cluster number may be obtained from adding the directory start cluster number to the data length of the directory. In other embodiments, the directory start cluster number may be obtained from subtracting the data length of the directory from the directory end cluster number.

In one exemplary embodiment, for a file recorded in the optical disc 110, the address mapping information contains a file LBA, a file start cluster number, a file end cluster number or file length information. The file LBA represents the physical address of the file recorded on the optical disc 110. The file start cluster number and the file end cluster number represent a start address and an end address that the file correlates to in the host terminal file system format, respectively. The file length information shows the data length of the file. Therefore, the file end cluster number may be obtained from adding the file start cluster number to the data length of the file. In other embodiments, the file start cluster number may be obtained from subtracting the data length of the file from the file end cluster number.

Figure 2:
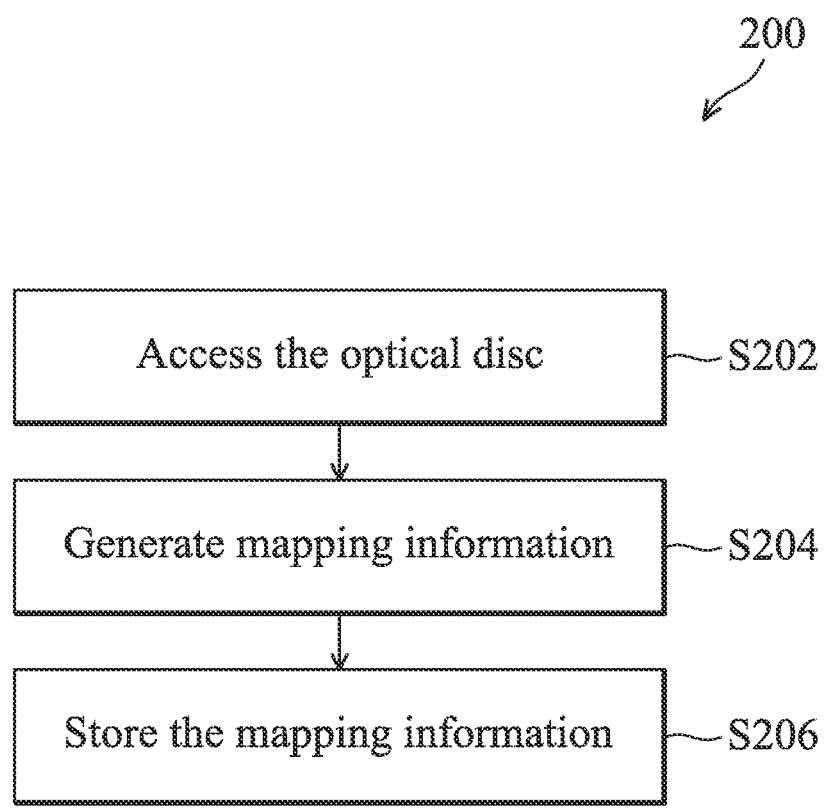
FIG. 2 is a flowchart depicting how the mapping information generation module generates the mapping information.

FIG. 2 is a flowchart depicting how the mapping information generation module 112 generates the mapping information in accordance with an exemplary embodiment of the invention. The flowchart 200 comprises steps S202, S204 and S206.

In step S202, the mapping information generation module 112 controls the optical pickup module 104 to access data or files recorded on the optical disc 110.

In step S204, mapping information of the accessed data or files are generated for mapping to the host terminal file system format.

In step S206, the mapping information is stored to the memory module 114.

Figure 3:
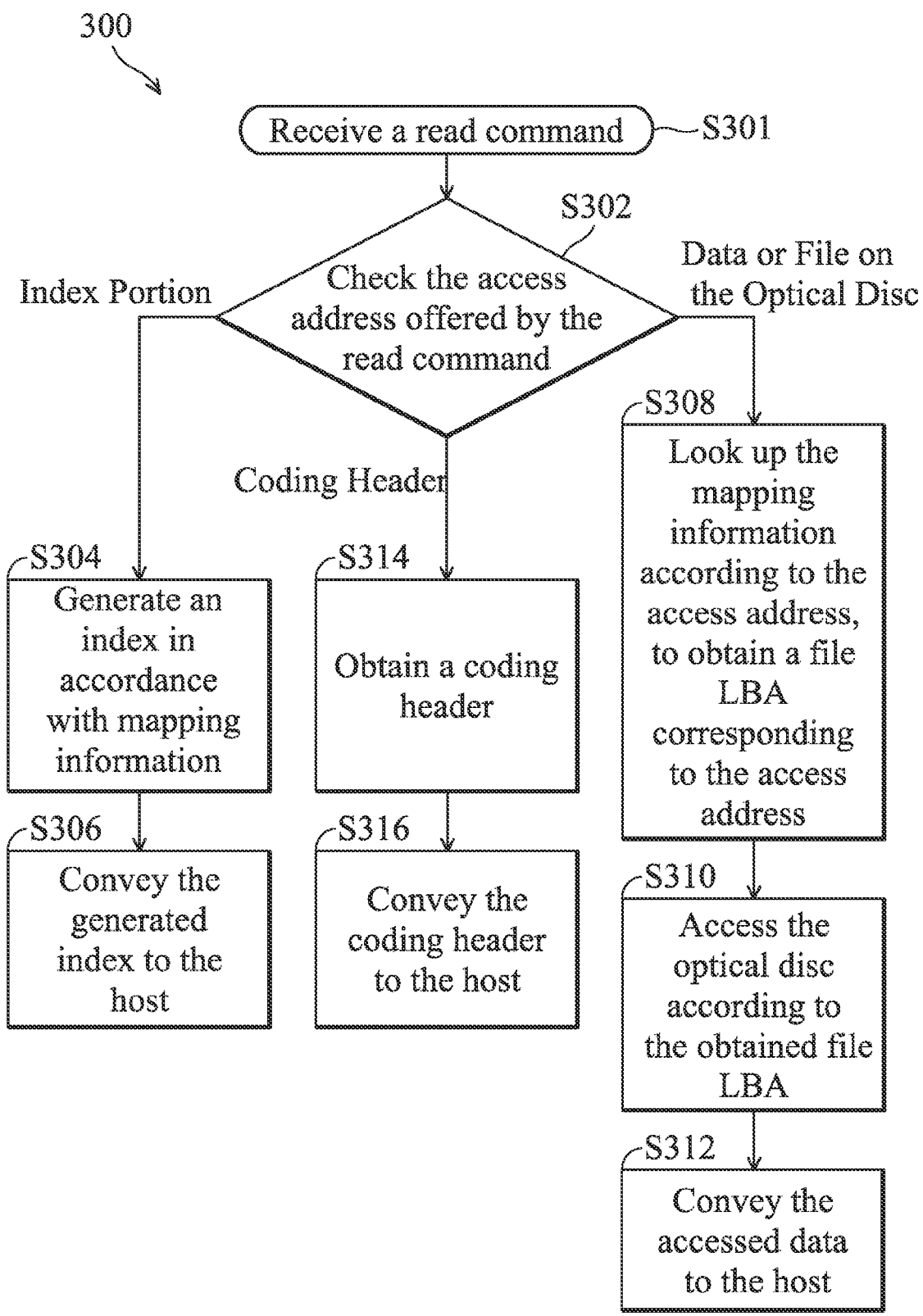
FIG. 3 is a flowchart depicting how the read-command processing module processes a read command.

FIG. 3 is a flowchart depicting how the read-command processing module 116 processes a read command in accordance with an exemplary embodiment of the invention, and is discussed as below with reference to the block diagram of FIG. 1. The flowchart 300 comprises steps S301 to S316. The host terminal file system (e.g. a FAT 32 file system format) comprises an index portion and a content portion. The index portion comprises a boot sector, a FAT sector and directories. The content portion follows the index portion, and comprises a plurality of files.

In step S301, the read-command processing module 116 receives a read command issued from the host 108 through the I/O port 102. The read command includes an access address that complies with the host terminal file system format.

In step S302, the read-command processing module 116 determines what information is requested by the read command in accordance with the access address conveyed by the read command. When the access address indicates the index portion of the host terminal file system format (e.g., in a case wherein the access address equals to the directory start cluster number), the read-command processing module 116 performs step S304. When it is determined in step S302 that the access address indicates a file of the host terminal file system format (e.g., in a case wherein the access address equals to the file start cluster number), the step S308 is performed. The steps S314 and S316 are designed for an audio disc or multimedia disc. When it is determined in step S302 that the access address indicates a coding header (e.g., a WAV header for audio data or an MPEG header for multimedia data), the step S314 is proceed.

In step S304, the optical disc 110 is accessed by referring to the mapping information (such as a directory LBA) stored in the memory module 114, and the accessed data is converted to obtain the contents of an index.

In step S306, the obtained contents of the index are conveyed to the host 108 via the I/O port 102.

In step S308, the read-command processing module 116 looks up the mapping information stored in the memory module 114 according to the access address, to obtain a file LBA corresponding to the access address.

In step S310, the read-command processing module 116 controls the optical pickup module 104 to access the optical disc 110 according to the obtained file LBA.

In step S312, the accessed data is conveyed to the host 108 via the I/O port 102.

In step S314, the read-command processing module 116 generates a coding header.

In step S316, the generated coding header is conveyed to the host 108 via the I/O port 102.

In view of the above, although the host 108 may be limited to specific file system formats, it can still properly access optical discs 110 that records data in a different file system format via the disclosed optical disc drive 100. Note that it is not required in the disclosed optical disc drive 100 to convert the entire optical disc 110 into the host terminal file system format used in the host and to store the considerable number of the converted data. In fact, the memory module 114 may store necessary mapping information that correlates the data with different file system format to the host terminal file system format. For the data or files recorded on the optical disc 110, only those data or files requested by the read command from the host 108 are actually converted to the host terminal file system format.

For different optical discs, alternative designs are provided as below for the mapping information generation module 112, the read-command processing module 116, the steps of generating the mapping information and the steps of processing the read command.

Figure 4A:
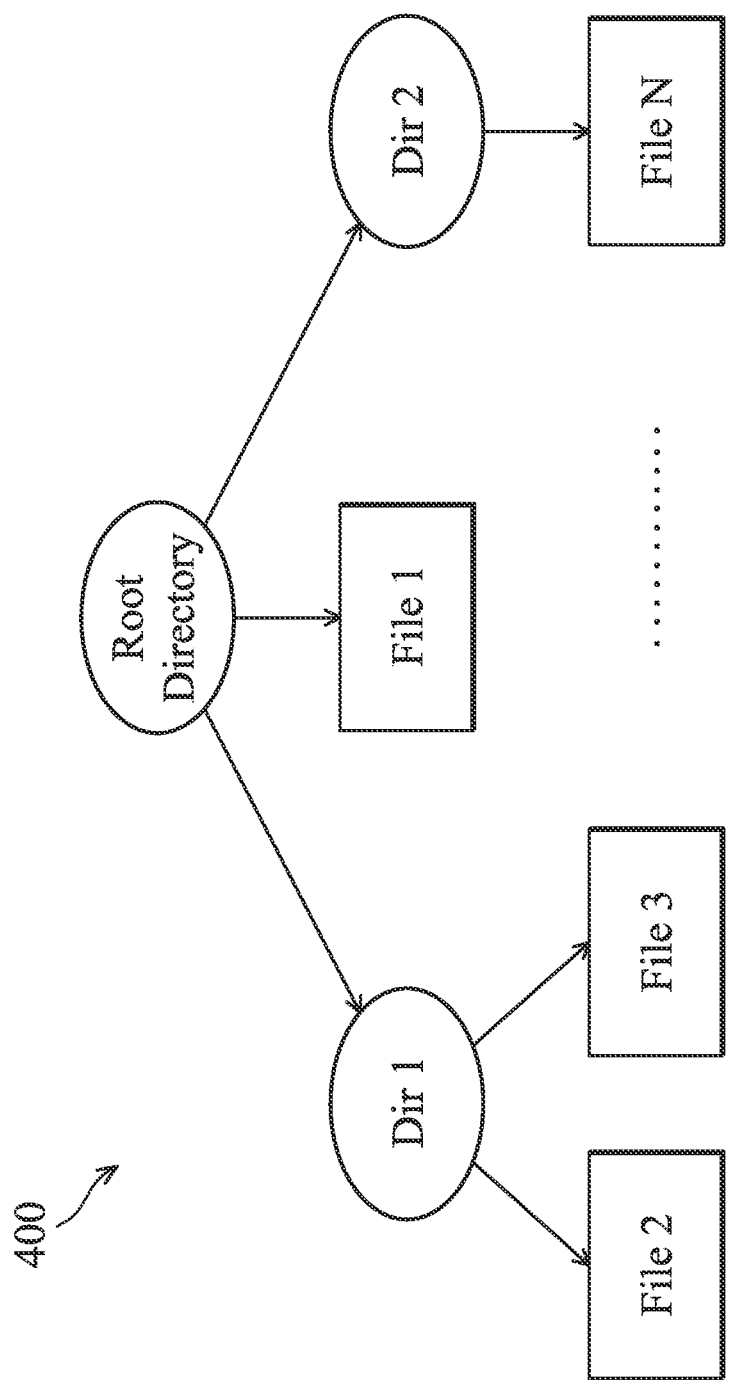
FIG. 4A illustrates a tree menu of a file disc.

First, please refer to FIG. 4A, which is a tree menu depicting the contents of a file disc. There is a root directory in the file disc. The root directory includes a subdirectory Dir1, a file File1 and another subdirectory Dir2. The subdirectory Dir1 includes two files File2 and File3. The subdirectory Dir2 includes one file FileN. The data recorded on the optical disc is in a first file system format, such as the ISO 9660 or UDF file system format. Note that the tree menu depicted in FIG. 4A does not intend to limit the scope of the invention. As well known by those skilled in the art, there may be one or more subdirectories and one or more files in a root directory, and each subdirectory may include one or more files.

In one exemplary embodiment, the mapping information of one file may further contain a shift value. The shift value is an offset between the requested access address and the file LBA corresponding thereto. With this shift value, it may be unnecessary for the mapping information generation module 112 to generate the aforementioned file start cluster number, file end cluster number, file LBA and file length information associated with the file. The read-command processing module 116 may add the shift value to the access address to obtain the file LBA corresponding thereto, and, the read-command processing module 116 may control the optical pickup module 104 to access the optical disc 110 according to the obtained file LBA, and the data at the obtained file LBA is read and conveyed to the host 108.

Figure 4B:
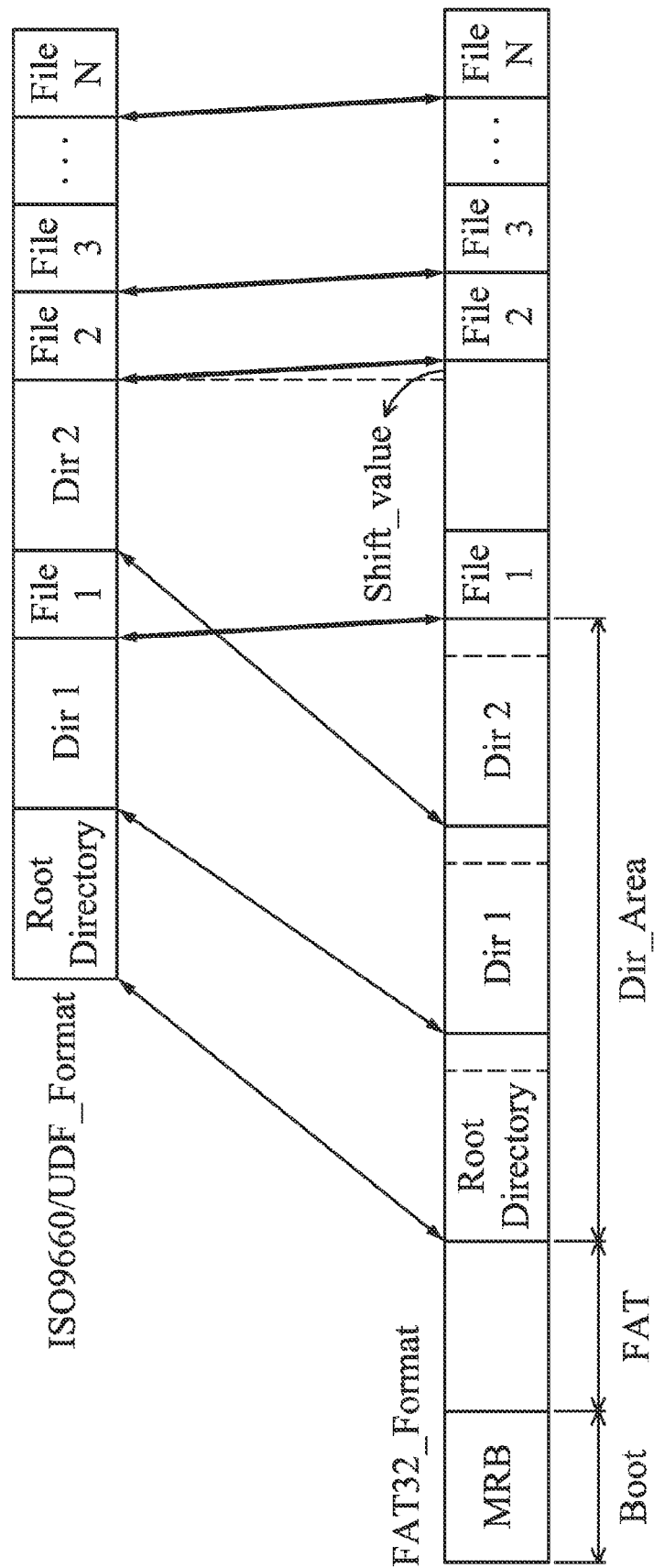
FIGS. 4B to 4D show several examples depicting how the directories and files recorded on a file disc are correlated to another file system format.
Figure 4C:
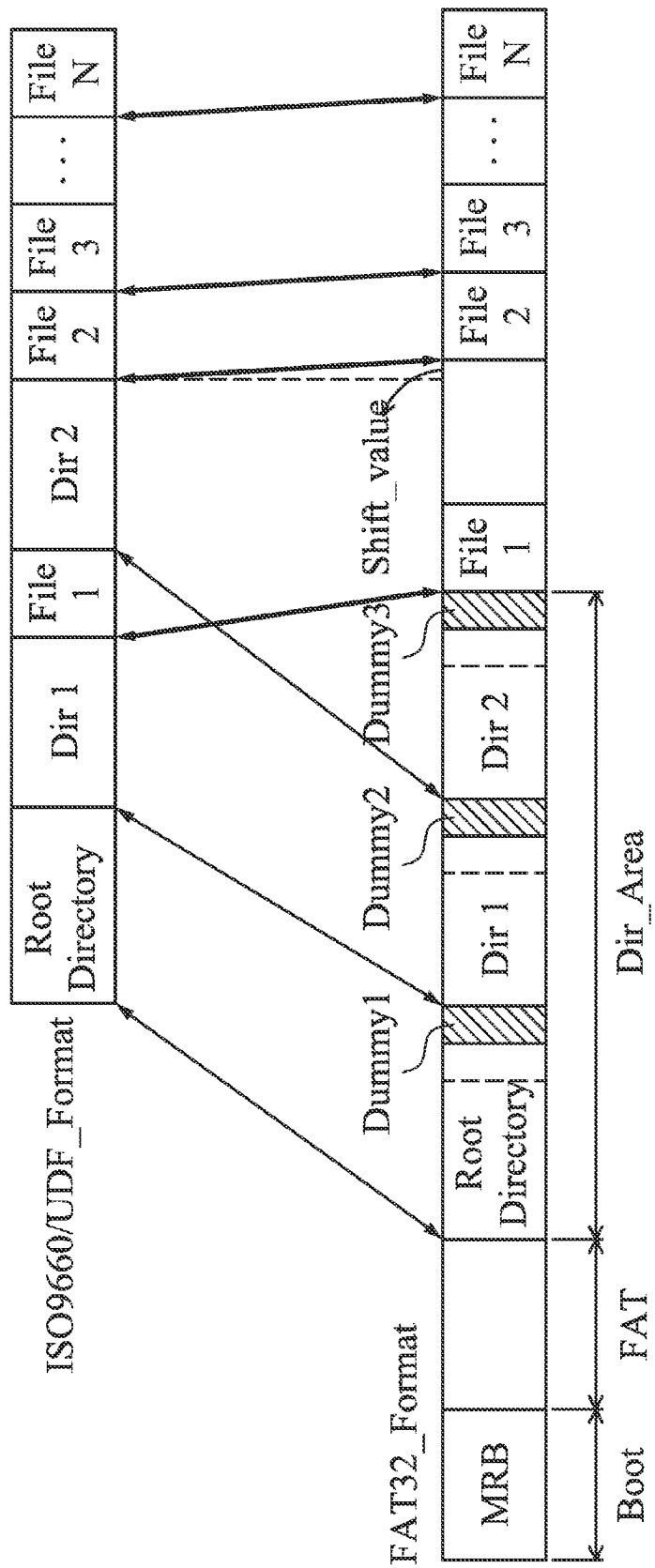
Figure 4D:
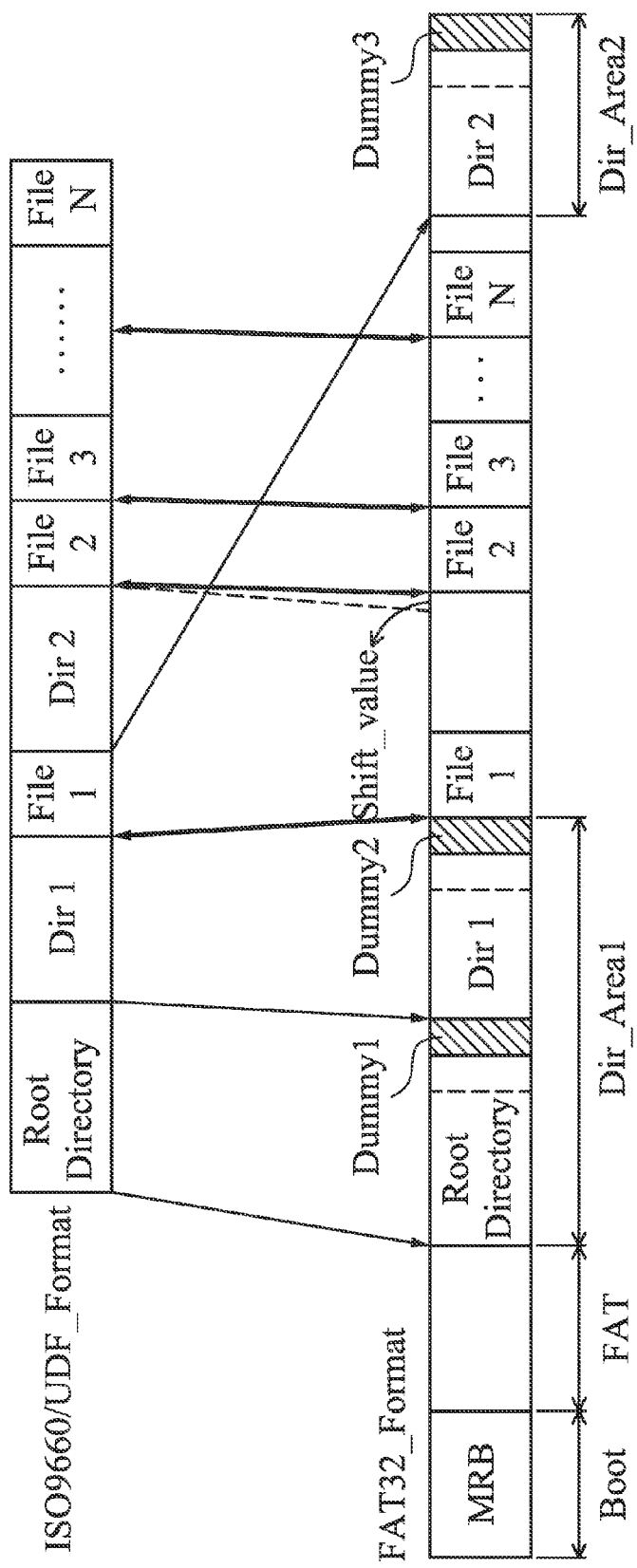

Please refer to FIGS. 4B, 4C and 4D, which show several examples depicting how the directories and files recorded on a file disc are correlated to another file system format. As shown in FIGS. 4B, 4C and 4D, the format structure ISO9660/USF_Format shows the arrangement of directories and files recorded on a file disc in the ISO 9660 or UDF file system format. FIGS. 4B, 4C and 4D each further show a FAT 32 format mapping structure which, according to the mapping information, is used to show the mapping relationship with the directories and files recorded on the file disc. In different FIGS. 4B to 4D, the FAT 32 format mapping structure are all labeled as FAT32_Format but are generated by different kinds of mapping information. Note that the data or files recorded on the optical disc are not actually converted to the FAT 32 file system format (as the FAT 32 format mapping structures shown in the Figures) until they are actually read by the host. The FAT 32 format mapping structures are shown to depict how the sectors (including a boot sector, a FAT sector, directories and files) of a FAT 32 file system format are arranged. There is an index portion and a content portion in a FAT 32 file system format. The index portion includes the boot sector, the FAT sector and directories. The content portion follows the index portion and comprises the files. In FIGS. 4B, 4C and 4D, exemplary embodiments of the configuration of the content portion of the FAT 32 file system format are shown.

Referring to FIG. 4B, the mapping information generated by the mapping information generation module 112 correlates all directories (including the root directory, the subdirectory Dir1 and the subdirectory Dir2) recorded on the file disc to a consecutive directory area Dir_Area of the FAT 32 format mapping structure FAT32_Format, and uses a shift value Shift_value to correlate all files (including File1, File2 . . . FileN) recorded on the file disc to an area after the directory area Dir_Area. Referring to the dotted lines shown in the consecutive directory area Dir_Area of the FAT 32 format mapping structure FAT32_Format, each directory recorded on the file disc (in the ISO 9660 or UDF file system format) may be converted to the FAT 32 file system format with increased bits. Because the directories are collectively correlated to the consecutive directory area Dir_Area, it is practicable to use an offset of the shift value Shift_value to correlate the files recorded on the file disc to an area subsequent to the directory area Dir_Area.

Referring to FIG. 4C, in this embodiment, the mapping information generation module 112 correlates all directories (including the root directory, the subdirectory Dir1 and the subdirectory Dir2) recorded on the file disc to a consecutive directory area Dir_Area in the FAT 32 format mapping structure FAT32_format while dummy spaces (containing dummy data Dummy1, Dummy2 and Dummy3) are alternatively allocated in the consecutive directory area Dir_Area, wherein each dummy space corresponds to one directory. By allocating the dummy spaces Dummy1, Dummy2 and Dummy3, the size of each directory may be expanded to fit to an integer multiple of an LBA-unit size of the FAT 32 file system format.

Referring to FIG. 4D, the mapping information generation module 112 uses an offset of a shift value Shift_Value to correlate all files (including File1, File2 to Fil3N) recorded on the file disc to a contiguous area between a first directory area Dir_area1 and a second directory area Dir_area2 of the FAT 32 format mapping structure FAT32_Format, as shown by the bold arrows.

In an exemplary embodiment, for a file recorded on a file disc, the mapping information associated with the file includes a file LBA, a shift value and file length information. The file LBA represents the physical address of the file indicating the physical address of the file in the file disc. A file start cluster number of the file may be obtained by adding the shift value to the file LBA. A file end cluster number of the file may be obtained by adding the file length and the shift value to the file LBA. Therefore, in the embodiments, the mapping information generation module 112 is not necessary to generate the file start cluster number and the file end cluster number to form the mapping information.

In another case wherein the optical disc is an audio disc, the design is discussed in detail as below.

Figure 5:
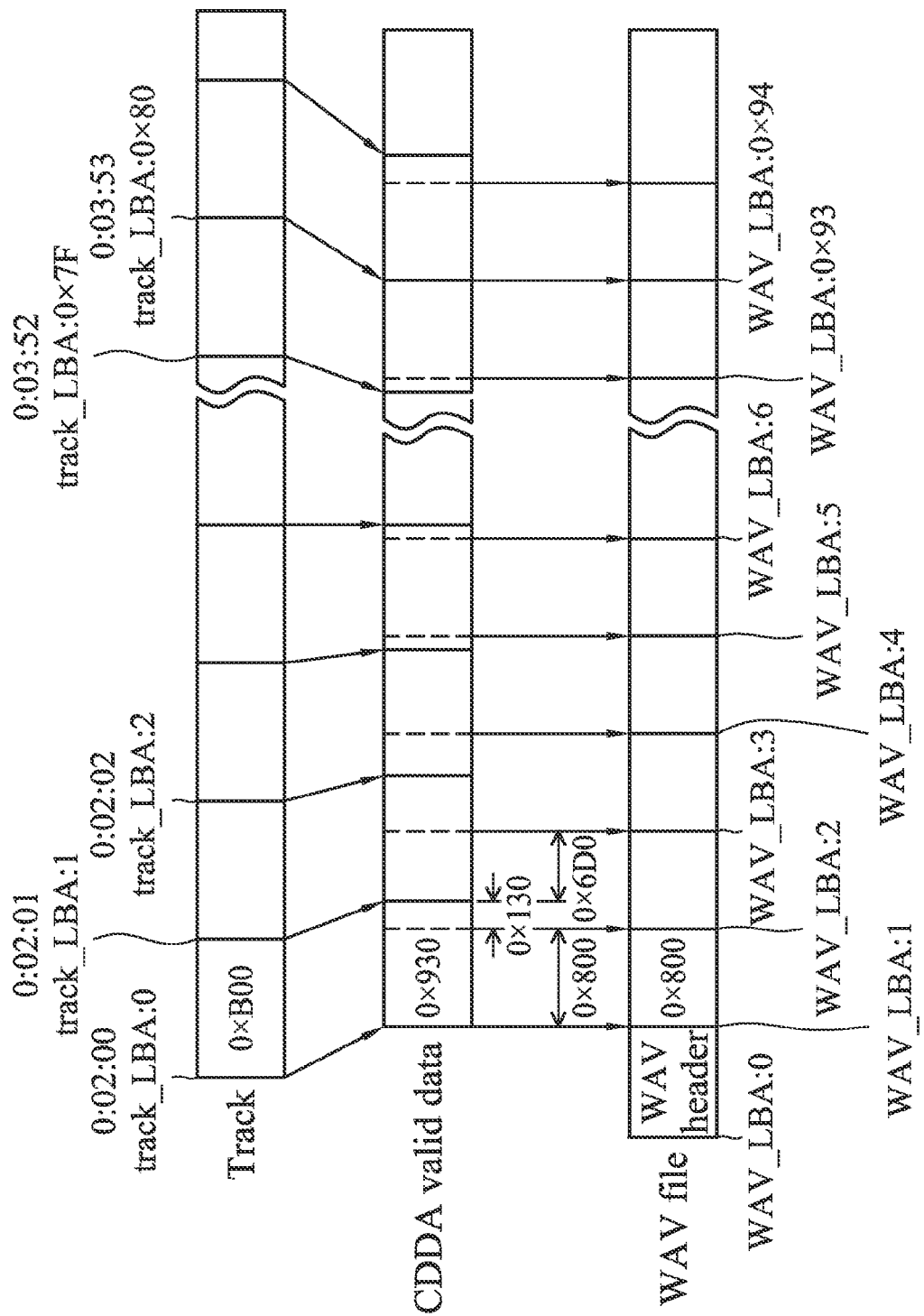
FIG. 5 shows how an audio track of an audio disc is correlated to another file system format.

FIG. 5 depicts one audio track in different file system formats. The audio track is recorded on an audio disc in accordance with the ISO 9660/UDF file system format, and contains at least one data block. Track addresses track_LBA indicate the address of the data blocks. Each data block is 0xB00 bytes long. In FIG. 5, the audio track begins from time index 0:02:00/track LBA 0 (track_LBA:0). For each data block, only 0x930 bytes, named CDDA valid data, are valid while the remaining are reserved for error detection and correction. Compared to the audio track of the ISO9660/UFD file system format, the WAV file of a FAT 32 file system format includes at least one WAV logical block indicated by a WAV LBA corresponding thereto (WAV_LBA), wherein the WAV logical block is 0x800 bytes long.

In one exemplary embodiment, the disclosed optical disc drive converts the audio tracks recorded on an audio disc in the ISO 9660/UDF file system format to data of the FAT 32 file system format for conveying to the host 108. In this embodiment, for one audio track, the mapping information generation module 112 generates address mapping information of the audio track, which includes the information about a space for a WAV header. In the FAT 32 file system format, the space addressed by the WAV LBA 0 (WAV_LBA:0, the first WAV logical block) is allocated as the WAV header space.

Referring to FIG. 5, an exemplary embodiment of the invention is shown, wherein the read-command processing module 116 receives a read command issued from the host 108 through the I/O port 102. The read command contains an access address HostAddr indicating the WAV LBA (WAV_LBA) requested by the read command. In accordance with an exemplary embodiment of the invention, the read command processing module 116 obtains data block according to a track LBA (track_LBA) corresponding to the access address (HostAddr). The steps of the disclosed method comprises:

Step 1: receiving a read command issued by the host 108, wherein the read command contains an access address HostAddr indicating a WAV LBA (WAV_LBA);

Step 2: determining the value of the access address HostAddr, wherein:

when the access address HostAddr is zero, it means that the access address HostAddr indicates a WAV header, so that the read-command processing module 116 generates the WAV header accordingly and conveys it to the host 108 via the I/O port 102; and when the access address HostAddr is not zero, it means that the access address HostAddr is one of the remaining WAV LBAs rather than indicating the WAV header, so that a value StartAddr is calculated, where StartAddr= (HostAddr−1); and Step 3: calculating a first parameter Offset in accordance with one of the following formulas:

Offset=(((StartAddr mod 0x93)*0x800) mod 0x930), or
Offset=(((StartAddr mod 0x93)*0x130) mod 0x930), wherein if the calculated Offset is not equal to zero, then set the first parameter Offset to be Offset=(0x930−Offset);

Step 4: calculating a second parameter TargetAddr, where TargetAddr=floor((StartAddr*0x800)/0x930)

The function floor( ) is used in obtaining the integer not greater than the number calculated by the function, i.e. the decimal portion is rounded down; and Step 5: using the read-command processing module 116 to control the optical pickup module 104 to access a target audio track logic block, based on the parameter TargetAddr, i.e., track_LBA: TargetAddr. The read-command processing module 116 controls the optical pickup module 104 to read 0x800 bytes of valid data starting from a sector which is located at Offset bytes behind the target audio track logical block. Then, the 0x800 bytes of valid data are conveyed to the host 108.

For example, when the access address HostAddr is 2, the calculated TargetAddr is 0 and the calculated Offset is 0x800. The read-command processing module 116 controls the optical pickup module 104 to start reading the audio disc from a block at track LBA 0 (track_LBA:0), and obtains 0x800 bytes of valid data from an a sector that is located at 0x800 bytes behind the beginning of the block at track_LBA:0 (i.e. the final 0x130 bytes within the data block of track LBA 0 (track_LBA:0) and the initial 0x6D0 bytes within the data block of track LBA 1 (track_LBA:1)) and conveys the obtained valid data to the host 108.

In another case wherein the optical disc is a multimedia disc, the design is discussed in detail as below.

Figure 6A:
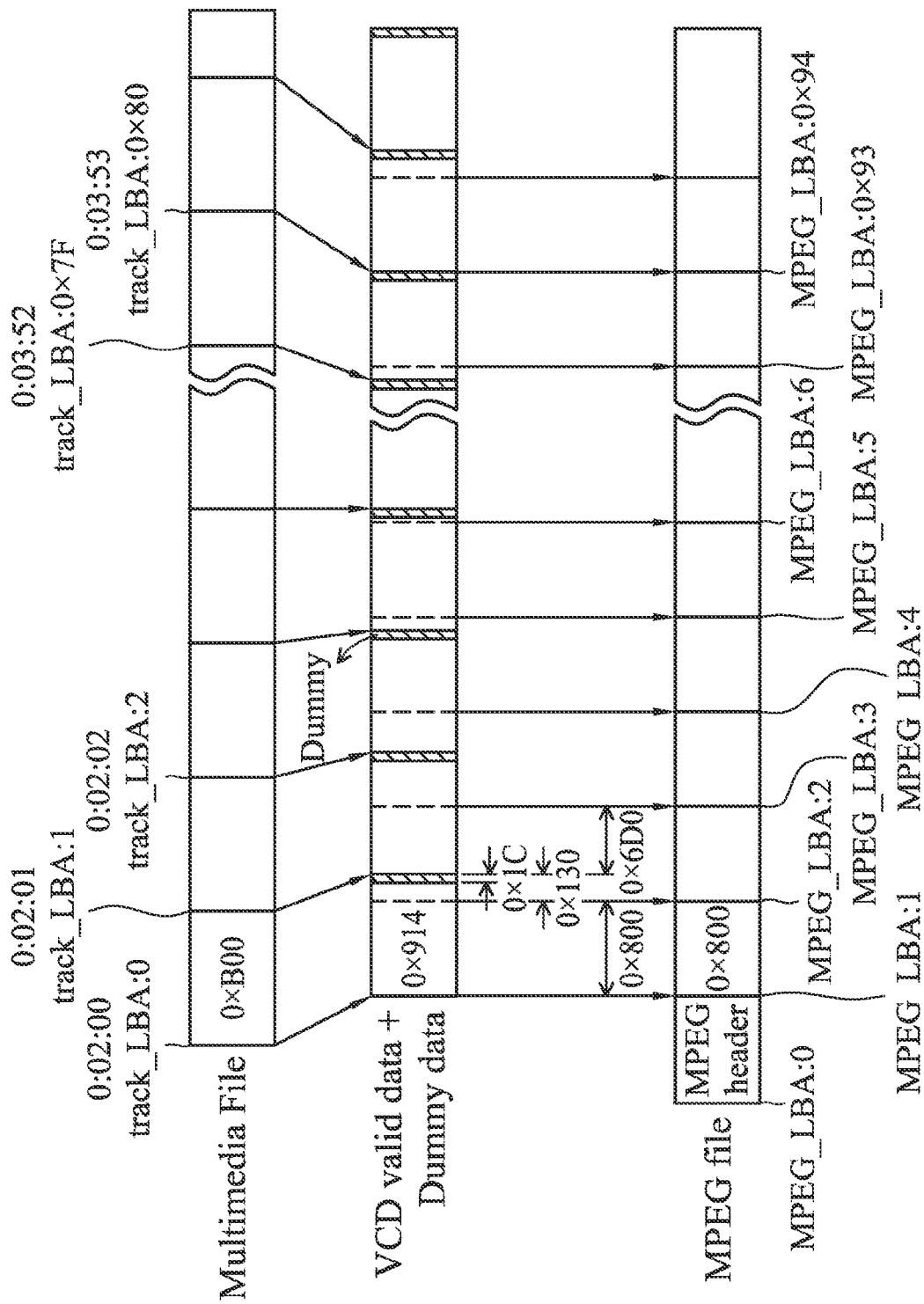
FIGS. 6A and 6B show several examples depicting how a multimedia file recorded on a multimedia disc is correlated to another file system format.
Figure 6B:
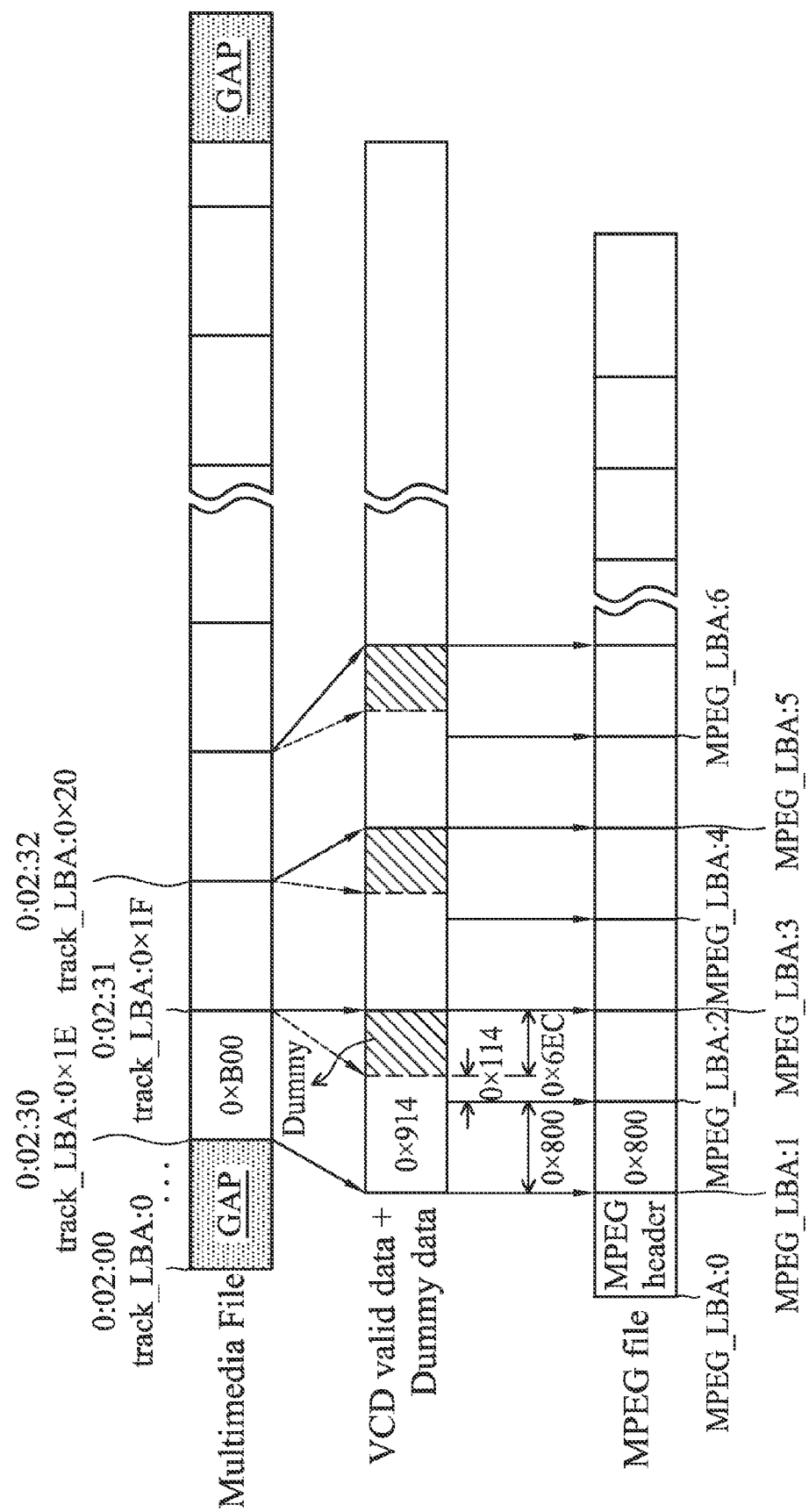

FIGS. 6A and 6B show several examples depicting how a multimedia file recorded on a multimedia disc is correlated to another file system format. The multimedia file is recorded on the tracks of the multimedia disc in accordance with the ISO 9660/UDF file system format, and contains a plurality of data blocks. Each data block is designated by a track LBA (track_LBA) and may contain 0xB00 bytes long data or other lengths depending on user demand. As shown in FIGS. 6A and 6B, a multimedia track starts from time index 0:02:00/ track LBA 0 (track_LBA:0). There are only 0x914 bytes of valid data, named VCD valid data, in each block while the remaining is reversed for error detection and correction. Compared to the ISO 9660/UFD file system format, the MPEG file complying with the FAT 32 file system format contains a plurality of MPEG logical blocks designated by the MPEG LBAs (MPEG_LBA). Each MPGA logical block is 0x800 bytes long.

In one exemplary embodiment, the disclosed optical disc drive converts a multimedia file recorded on an optical disc in the ISO 9660/UDF file system format to data of the FAT 32 file system format for conveying to the host 108. In this embodiment, the mapping information generation module 112 generates address mapping information of the multimedia file, which includes the information about a space for an MPEG header. In the FAT 32 file system format, the space addressed by the MPEG LBA 0 (MPEG_LBA:0, the first MPEG logical block) is allocated as the MPEG header space.

Referring to FIG. 6A, an exemplary embodiment of the invention is shown and is discussed in detail as below. The read-command processing module 116 receives a read command issued from the host 108 through the I/O port 102. The read command contains an access address HostAddr indicating the requested MPEG LBA (MPEG_LBA). When the read command issued by the host 108 requests to access the MPEG LBA 0 (MPEG_LBA:0), the read-command processing module 116 may access the multimedia disc by referring to the mapping information (e.g., a shift value) stored in the memory module 114 and converts the accessed data to generate the data of the MPEG header, and conveys the generated MPEG header to the host 108 via the I/O port 102.

In the exemplary embodiment of FIG. 6A, the read command processing module 116 adds dummy data Dummy (0x1C bytes) to the end of each VCD valid data sector (0x914 bytes) and thereby the VCD valid data in each block is expanded to 0X930 bytes. In this manner, methods and steps similar to those used in accessing the audio disc are practicable in accessing the multimedia disc, so that data requested by the host 108 is obtained from the track LBA (track_LBA) corresponding thereto.

In another exemplary embodiment shown in FIG. 6B, the read-command processing module 116 adds 0x6EC bytes of dummy data Dummy at the end of each VCD valid data sector (0x914 bytes) and thereby the VCD valid data in each block is expanded to two-times that of 0x800 bytes, which is the same size as two MPEG blocks. The computation of the read-command processing module 116 can be considerably reduced by this design.

Figure 7:
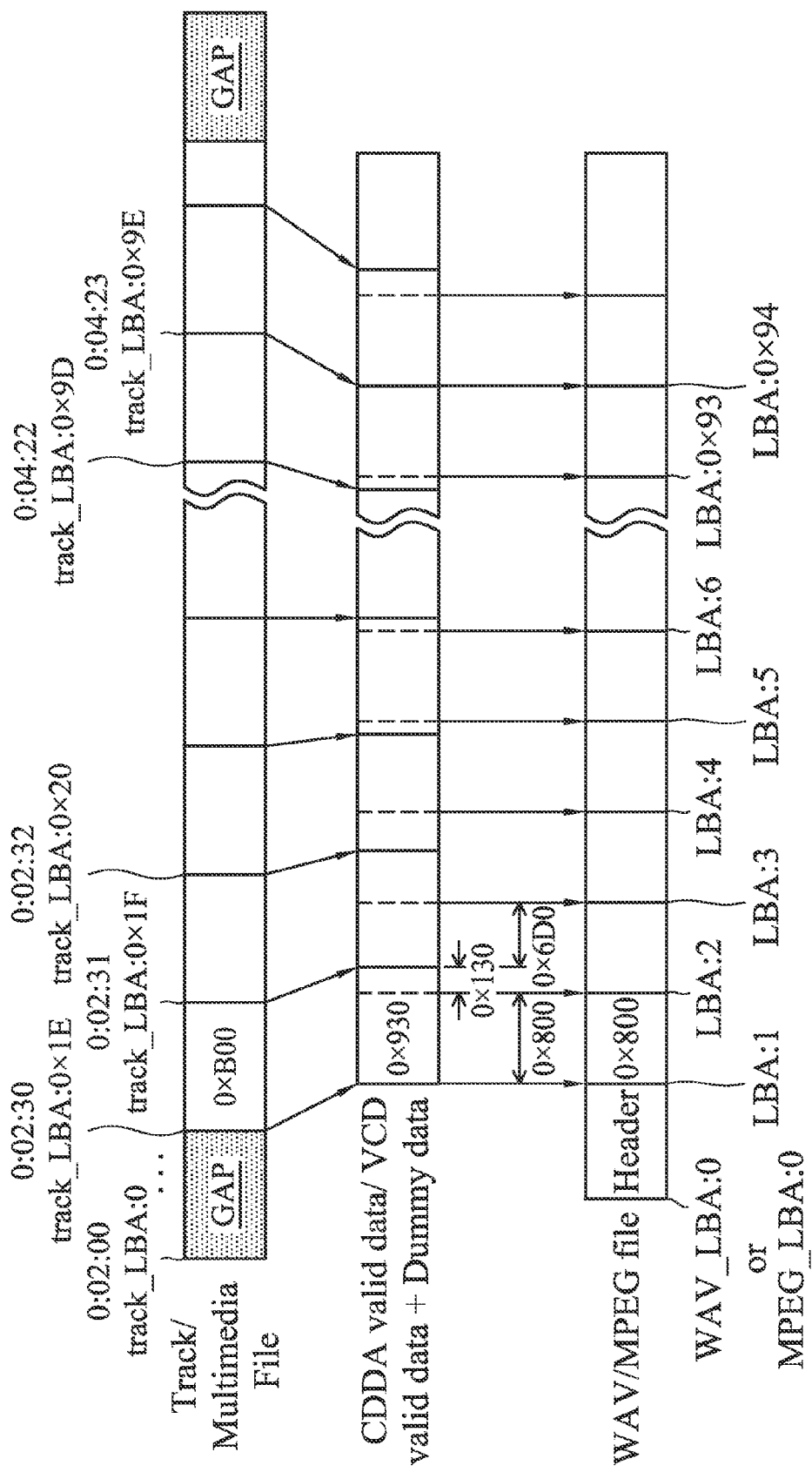
FIG. 7 is another example showing how a multimedia file recorded on a multimedia disc is correlated to another file system format.

FIG. 7 is another example showing how a multimedia file recorded on a multimedia disc is correlated to another file system format. Note that the gaps (GAP) between the tracks of the audio or multimedia disc are ignored and are not considered as valid data. For a person skilled in the art, the techniques of FIG. 7 can be easily understood by referring to the embodiments shown in FIGS. 5, 6A and 6B. Thus, for simplicity, the similar techniques are not repeated.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical disc drive, comprising
an I/O port, for coupling a host to receive a read command issued from the host, wherein the read command complies with a host terminal file system format;
an optical pickup module, operative to access an optical disc of the optical disc drive, wherein the optical disc contains data recorded in a first file system format that is different from the host terminal file system format; and
a format conversion unit, coupled between the I/O port and the optical pickup module, comprising:
a mapping information generation module, controlling the optical pickup module to access the data contained in the optical disc, and generating mapping information of the data contained in the optical disc, wherein the mapping information correlates directories recorded in the first file system format to a consecutive directory area of a mapping structure of the host terminal file system format, and correlates all files recorded on the optical disc to an area subsequent to the consecutive directory area, wherein the directories comprise a root directory and at least a subdirectory, wherein the mapping information contains a shift value, the shift value represents an offset between a file access address requested in the read command and a file logical block address;
a memory module, storing the mapping information; and
a read-command processing module, adding the shift value to the requested file access address to obtain the file logical block address, and controlling the optical pickup module to access the optical disc according to the obtained file logical block address.

2. The optical disc drive as claimed in claim 1, wherein the mapping information comprises data of a boot sector, FAT sector address mapping information and directory/file address mapping information.

3. The optical disc drive as claimed in claim 2, wherein, for one directory, the directory/file address mapping information comprises at least one of a directory logical block address, a directory start cluster number, a directory end cluster number and directory length information, wherein the directory logical block address represents a physical address on the optical disc that indicates the directory, the directory start cluster number and the directory end cluster number represent a start address and an end address that the directory correlates to in the host terminal file system format, respectively, and the directory length information shows data length of the directory.

4. The optical disc drive as claimed in claim 2, wherein, for one file, the directory/file address mapping information comprises at least one of a file logical block address, a file start cluster number, a file length information, and a file end cluster number, wherein the file logical block address represents a physical address on the optical disc that indicates the file, the file start cluster number and the file end cluster number represent a start address and an end address that the file correlates to in the host terminal file system format, respectively, the file length information shows data length of the file.

5. A method of accessing an optical disc, comprising:
a) receiving a read command from a host, wherein the read command complies with a host terminal file system format;
b) accessing the optical disc of an optical disc drive to generate mapping information of data contained in the optical disc, wherein data recorded on the optical disc has a first file system format that is different from the host terminal file system format;
c) storing the mapping information in a memory module, wherein the mapping information correlates directories recorded in the first file system format to a consecutive directory area of a mapping structure of the host terminal file system format, and correlates all files recorded on the optical disc to an area subsequent to the consecutive directory area, wherein the directories comprise a root directory and at least a subdirectory, wherein the mapping information of one file contain a shift value, the shift value represents an offset between a file access address requested in the read command and a file logical block address; and
d) adding the shift value to the requested file access address to obtain the file logical block address, and accessing the data recorded on the optical disc according to the obtained file logical block address.

6. The method as claimed in claim 5, wherein the step d) further comprises:
d1) determining an access address of the read command, wherein the access address complies with the host terminal file system format;
d2) when the access address indicates an index portion of the host terminal file system format, generating contents of the index portion based on the mapping information;
d3) when the access address indicates a file of the host terminal file system format, referring to the mapping information stored in the memory module to obtain a file logical block address corresponding to the access address and accessing the optical disc according to the obtained file logical block address; and
d4) when the access address indicates a header within audio or multimedia data, generating a coding header corresponding thereto.

7. The method as claimed in claim 5, wherein the mapping information comprises data of a boot sector, FAT sector address mapping information and directory/file address mapping information.

8. The method as claimed in claim 7, wherein, for one directory, the directory/file address mapping information comprises at least one of a directory logical block address, a directory start cluster number, a directory end cluster number and directory length information, wherein the directory logical block address represents a physical address on the optical disc that indicates the directory, the directory start cluster number and the directory end cluster number represent a start address and an end address that the directory correlates to in the host terminal file system format, respectively, and the directory length information shows data length of the directory.

9. The method as claimed in claim 7, wherein, for one file, the directory/file address mapping information comprises at least one of a file logical block address, a file start cluster number, and a file end cluster number, wherein the file logical block address represents a physical address on the optical disc that indicates the file, the file start cluster number and the file end cluster number represent a start address and an end address that the file correlates to in the host terminal file system format, respectively, the file length information shows data length of the file.

10. The method as claimed in claim 5, wherein the optical disc comprises a file with the first file system format, the file is recorded in a plurality of data blocks on the optical disc, each of the data blocks is designated by a file logical block address and each data block is able to record a first number of bytes data, and the step d) further comprises:
- d5) calculating a first parameter Offset and a second parameter TargetAddr according to the read command;
- d6) accessing a target logical block of the optical disc according to the first parameter Offset and the second parameter TargetAddr, wherein the file logical block address of the target logical block is the second parameter TargetAddr; and
- d7) obtaining data of a second number of bytes from a sector which is located at the first parameter bytes of data behind the beginning of the target logical block.

11. The optical disc drive as claimed in claim 1, wherein the mapping structure of the host terminal file system format according to the mapping information include a boot sector, a FAT sector, the consecutive directory area and files which are arranged in sequence.

12. The method as claimed in claim 5, wherein the mapping structure of the host terminal file system format according to the mapping information include a boot sector, a FAT sector, the consecutive directory area and files which are arranged in sequence.

\* \* \* \* \*